June 3, 1930.  R. HOE  1,761,564
WASHING APPARATUS
Filed Aug. 3, 1927
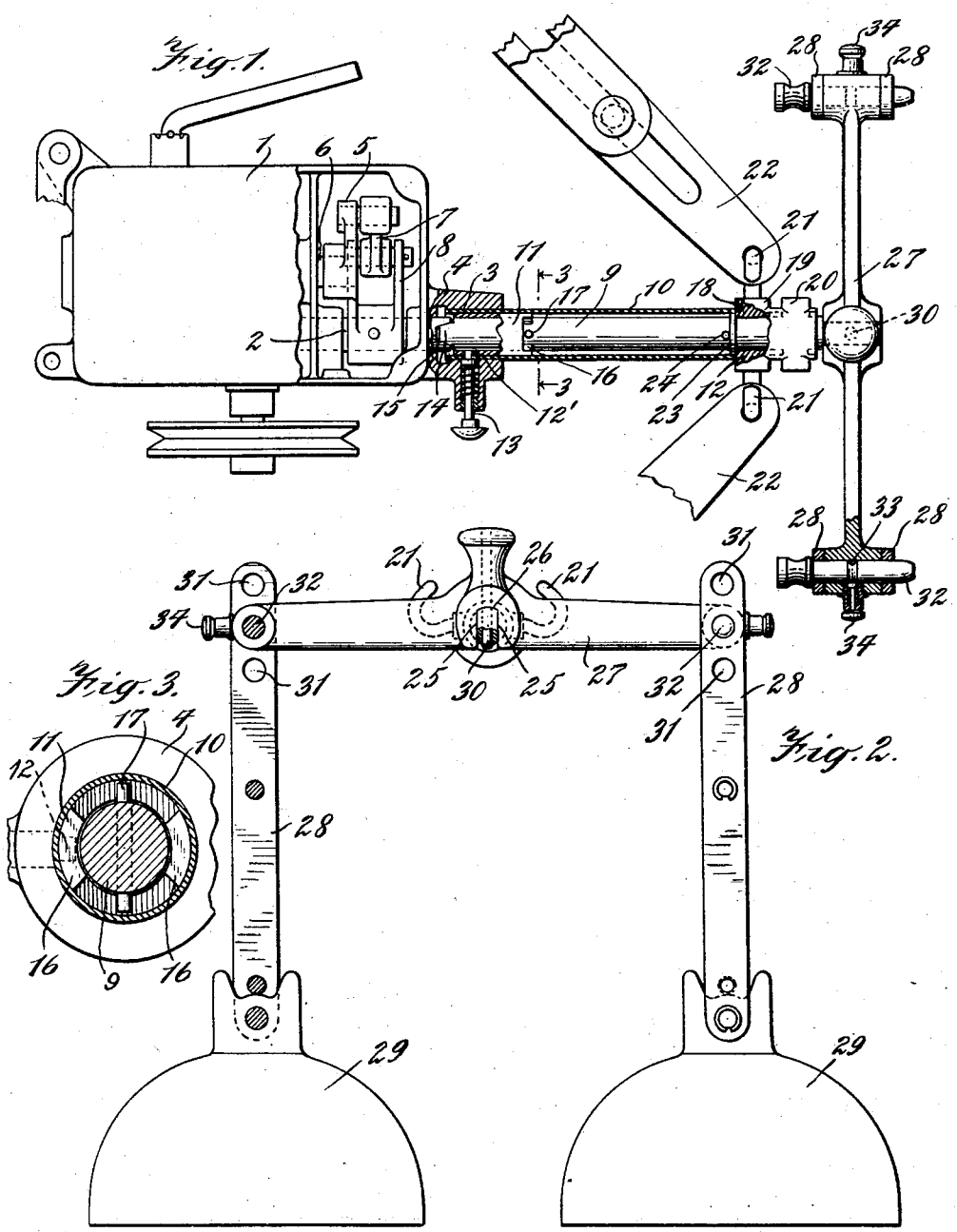
INVENTOR.
Robert Hoe
BY Gifford & Scull
ATTORNEYS.

Patented June 3, 1930

1,761,564

UNITED STATES PATENT OFFICE

ROBERT HOE, OF HYDE PARK, NEW YORK

WASHING APPARATUS

Application filed August 3, 1927. Serial No. 210,264.

This invention relates to washing apparatus, and is directed more particularly to certain improvements upon the apparatus described and claimed in my copending applications, Serial Nos. 138,356 and 200,574.

The invention will be best understood from the following description, and the accompanying drawing, in which I have shown a selected embodiment of the invention, in which:—

Fig. 1 is a plan view, partly in section and partly broken away, of a portion of an apparatus having my invention embodied therein.

Fig. 2 is a view taken from the right of Fig. 1.

Fig. 3 is a section on an enlarged scale and taken on the line 3—3 of Fig. 1.

Referring now to the drawing, more in detail, the numeral 1 designates a casing in which is disposed the operating mechanism of a washing apparatus. Such mechanism is more fully described and claimed in my aforesaid copending application, Serial No. 200,574.

For the purposes of this application, it may be said that the mechanism comprises means for giving an oscillating motion to a rock shaft 2 which is journaled within the casing and extends through a wall thereof, into a bore 3 in a boss 4. The mechanism for giving such oscillating motion is exemplified by the crank 5 mounted upon a continuously rotating shaft 6, and connected by a link 7 to a crank 8 secured to the rock shaft. The shaft 6 is rotated by suitable means such as that described in my aforesaid application.

Disposed within the bore 3 is a bearing for the rock shaft 9 which forms a continuation of the rock shaft 2. One of the features of this invention is to make the shafts 9 and 2 readily detachable, whereby the shaft 9 may be easily removed from the rest of the apparatus when not in use. The shaft 9 is received within a sleeve 10 which contains at its opposite ends, bearings 11 and 12. The bearing 11 is securely held in the sleeve by any suitable means, and is provided with a hole 12' registering with corresponding holes in the sleeve and in the boss 4 to receive a spring pressed plunger 13 which will hold the sleeve and bearing securely in stationary position in the boss.

The shaft 9 is provided at its inner end with a clutch element 14 coacting with corresponding elements 15 upon the shaft 2, whereby when the sleeve is inserted in place, the shafts will be clutched together. The two shafts will then be actuated as one. The bearing 11 is preferably provided at its outer ends with lugs 16 which form stops coacting with a pin 17 to limit rocking movement of the shaft for a purpose which will presently appear.

The outer end of the shaft 9 is supported in the bearing 12, and preferably this bearing is cast integrally with the sleeve 10, the sleeve being provided with suitable holes 18 through which the bearing metal, when cast, may pass to form projections 19 and 20. The projections 19 are bored to receive hooks 21 which are adapted to engage adjustable bracing members 22, these members being adapted to engage a tub, in the manner set forth in my aforesaid copending application, Serial No. 138,356.

The projections 20 may be bored to receive a loop (not shown), for the purpose set forth in the same copending application. By this means, a very efficient integral structure is provided, and one which may be easily and cheaply made.

Engaging the bearing 12 is a washer 23 which in turn is engaged by a pin 24 on the shaft 9, thus limiting longitudinal movement of the shaft in the bearing in one direction, the pin 17 and bearing 11 preventing movement in the opposite direction.

The outer end of the shaft 9 projects from the bearing 12, and is provided with a pair of oppositely disposed flat surfaces 25, which are adapted to engage corresponding surfaces upon a recess 26 in an arm 27, to which are pivotally connected rods 28 carrying the washing devices, such as bells 29.

One of the important features of this invention resides in the means for detachably connecting the shaft 9 and the arm 27. It is known to provide a rocking arm such as the arm 27, with a recess to receive a rock shaft, but it has usually been considered necessary to secure these two parts rigidly together, as by means of set screws or latches of various kinds.

By my invention, I avoid any positive locking means, but at the same time effectively secure the parts together, while permitting easy assemblage and dismantling.

Disposed in the arm 27 and extending into the recess 26 is a pin 30 which is received within a suitable hole in the end of the shaft, this hole extending substantially parallel to the flat surfaces. By this means the arm and shaft are operatively attached to each other, and may be detached, both by a simple rectilinear movement. The force applied to the arm is transmitted thereto through a bell 29 and its supporting rods, but such force is only exerted when the shaft is tilted so that the flat portions thereof occupy a position which is inclined to the vertical position shown in the drawing. Therefore, the force exerted on the arm is transmitted to one of the flat surfaces on the shaft and does not tend to remove the arm in a direction parallel to the flat surface. The component of the applied force which is parallel to the flat surface is insufficient to cause relative movement between the arm and the shaft. It has been found, however, that the force may cause a tilting movement of the arm longitudinally of the shaft and if this tilting action continues, the arm may be worked off the shaft. This result is obviated by the pin 30 which prevents such tilting action.

The arms 28 are provided with a plurality of holes 31 which are adapted to receive pins 32 to secure the rods in adjustable position on the arm. It is important that these pins may be readily removed so as to permit adjustment and yet shall be held in place against accidental removal. For that purpose, I have provided each pin with a peripheral groove 33 which is adapted to receive a point of a spring pressed detent as a plunger 34, which is mounted in each end of the arm 27. By this arrangement the pins may be pushed into place and resiliently locked in position by the plunger, and may then be as easily removed, the springs of the plungers yielding to permit such movement.

In operation, the sleeve 10 and its bearings, with the shaft 9 therein, may be inserted in the bore 3, the plunger 13 being pulled outwardly to permit such insertion. When the plunger engages in the holes in the sleeve and bearing 11, the shaft and its bearings are rigidly held in operative position with the parts 14 and 15, clutching together the shafts 2 and 9. The bracing members 22 may then be put in place and the arm 27 attached to the shaft 9. The rods 28 may then be connected to the arm and the apparatus is ready for operation.

When the washing operation has ended, the parts may be dismantled by reversing the above operations. When this is done, it may be that the operator will remove the sleeve 10 from the bore 3 before removing the arm 27. In that case, it may be that the arm would rotate an excessive amount, and in fact sufficiently so as to cause the arm 27 to fall off from the shaft. To avoid any such trouble, the stops 16 and pin 17 have been provided, whereby the arm will remain in proper position for easy handling of the entire device.

I claim:—

1. A washing apparatus comprising a rock shaft having a portion provided with oppositely disposed flat surfaces, and an arm adapted to support washing devices and having an open recess adapted to receive said portion of the rock shaft, said arm being freely movable with respect to said shaft in a direction parallel to said surfaces, and elements on the shaft and arm engaging each other to prevent tilting movement of said arm longitudinally of said shaft.

2. A washing apparatus comprising a rock shaft having a portion provided with oppositely disposed flat surfaces, and an arm adapted to support washing devices and having a recess adapted to receive said portion of the rock shaft, said arm being freely movable with respect to said shaft in a direction parallel to said surfaces, and a pin on said arm extending into said recess and adapted to be received in a hole in said shaft.

3. A washing apparatus comprising a rock shaft having a portion provided with oppositely disposed flat surfaces, and an arm adapted to support washing devices and having a recess adapted to receive said portion of the rock shaft, said arm being freely movable with respect to said shaft in a direction parallel to said surfaces, and a pin on said arm extending into said recess and adapted to be received in a hole in said shaft, said pin and hole being disposed substantially parallel to said flat surfaces.

4. A washing apparatus comprising a rock shaft having a bearing, washing devices carried by said shaft, mechanism to operate said shaft, means to detachably hold said bearing with the shaft in operative relation to said mechanism, stops on said bearing, and a pin on said shaft cooperating with said stops to limit rotation of the shaft in the bearing.

5. A washing apparatus comprising a casing provided with a boss having a bore therein, a bearing, means for detachably securing said bearing in said bore, a rock shaft in said casing and extending through the wall thereof into said bore, a second rock shaft carried by said bearing, washing devices carried by said second rock shaft, and coacting means on said shafts to clutch them together when said bearing is secured in said bore.

6. A washing apparatus comprising a rocking arm, a rod adapted to support a washing device, a pin passing through said arm and rod, and a spring pressed detent yieldingly holding said pin in place.

7. A washing apparatus comprising a rocking arm, rods disposed upon opposite sides of said arm and adapted to support a washing device, a pin passing through said arm and rods, and a spring pressed detent yeldingly holding said pin in place.

8. A washing apparatus comprising a sleeve, a rock shaft in said sleeve, washing devices carried by said shaft, a bearing for said shaft in said sleeve and having projections extending through holes in the sleeve, and hooks on said projections adapted to engage bracing members.

9. A washing apparatus comprising a sleeve having a rock shaft disposed therein and projecting therefrom at one end, washing devices carried by said end, spaced bearings for said shaft disposed between the shaft and sleeve, means on said shaft and engaging said bearings, to limit longitudinal movement between the shaft and the bearings, and means on the shaft and on at least one of the bearings cooperating to limit rocking movement of the shaft in the bearings.

10. A washing apparatus comprising a rock shaft, an arm adapted to support washing devices, cooperating elements on said shaft and arm engaging each other and adapted to prevent relative rotation between the shaft and arm, said elements being brought into and out of engagement by movement of the arm transversely of the shaft and when in engagement extending transversely of the shaft, the shaft and arm being free of means preventing such transverse movement, and elements on the shaft and arm engaging each other to prevent tilting movement of said arm longitudinally of said shaft.

11. In a washing machine, an oscillating horizontal power shaft having a flat portion with its sides generally vertical, an arm having a slot between its ends with the sides engaging said flat portion, said slot being open at its bottom, elements on the shaft and arm engaging each other to prevent tilting movement of said arm longitudinally of the shaft, and a washing bell at each end of said arm and depending therefrom.

ROBERT HOE.